(12) United States Patent
Sun et al.

(10) Patent No.: US 11,262,235 B2
(45) Date of Patent: Mar. 1, 2022

(54) LIGHT INTENSITY DETECTING DEVICE, SCREEN MEMBER AND MOBILE TERMINAL

(71) Applicant: BEIJING XIAOMI MOBILE SOFTWARE CO., LTD., Beijing (CN)

(72) Inventors: Changyu Sun, Beijing (CN); Jie Fan, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 100 days.

(21) Appl. No.: 16/745,335

(22) Filed: Jan. 16, 2020

(65) Prior Publication Data
US 2021/0072075 A1    Mar. 11, 2021

(30) Foreign Application Priority Data

Sep. 11, 2019   (CN) .......................... 201910859156.8

(51) Int. Cl.
*G01J 1/16* (2006.01)
*G01J 1/02* (2006.01)
*G01J 1/42* (2006.01)

(52) U.S. Cl.
CPC .......... *G01J 1/1626* (2013.01); *G01J 1/0238* (2013.01); *G01J 1/0271* (2013.01); *G01J 1/4204* (2013.01)

(58) Field of Classification Search
CPC ............. G01J 1/4204; G01J 2001/4266; G01J 1/0271; G01J 1/0238; G01J 1/02; G01J 1/1626; G01J 1/16; G01J 2001/1663; G09G 2320/0626; G09G 2360/144; G09G 2360/14; G09G 2360/145; G09G 2360/147; G09G 2360/148; G09G 3/20; G09G 3/34; G09G 3/3406
See application file for complete search history.

(56) References Cited

U.S. PATENT DOCUMENTS

| | | | |
|---|---|---|---|
| 2008/0001912 A1* | 1/2008 | Koide | G09G 3/3648 345/102 |
| 2010/0020009 A1 | 1/2010 | Nakanishi | |
| 2010/0141623 A1 | 6/2010 | Nakanishi et al. | |
| 2019/0178712 A1 | 6/2019 | Wang et al. | |

(Continued)

OTHER PUBLICATIONS

Extended European Search Report in the European Application No. 20152922.9, dated Jul. 9, 2020, (9p).

(Continued)

*Primary Examiner* — John R Lee
(74) *Attorney, Agent, or Firm* — Arch & Lake LLP

(57) ABSTRACT

A device for detecting light intensity, a display screen and a mobile terminal are provided. The device for detecting light intensity includes a controller, and a first photosensitive sensor and a second photosensitive sensor which are electrically coupled to the controller, the first photosensitive sensor and the second photosensitive sensor being spaced apart and located in a same illumination environment, and the controller is configured to, when an external beam illuminates the first photosensitive sensor, perform calculation based on a difference value between illumination parameters of the first photosensitive sensor and the second photosensitive sensor to obtain a light intensity of the external beam.

20 Claims, 7 Drawing Sheets

(56) References Cited

U.S. PATENT DOCUMENTS

2021/0027035 A1* 1/2021 Tan .......................... G02F 1/29
2021/0072075 A1* 3/2021 Sun ...................... G01J 1/0271

OTHER PUBLICATIONS

Matsuki, Fumirou et al., "Integrated Ambient Light Sensor with an LTPS Noise-Robust circuit and a-Si Photodiodes for AMLCDs", IEICE Transactions on Electronics, Institute of Electronics, Tokyo, Japan, vol. E93C, No. 11, Nov. 1, 2010, (8p).

* cited by examiner

LIGHT INTENSITY DETECTING DEVICE, SCREEN MEMBER AND MOBILE TERMINAL

CROSS-REFERENCE TO RELATED APPLICATIONS

This application is based upon and claims priority to Chinese Patent Application No. 201910859156.8, filed on Sep. 11, 2019, the entire contents of which are incorporated herein by reference.

BACKGROUND

A mobile terminal such as a mobile phone or a tablet computer is provided with a display screen to output corresponding display information. The display screen or device housing is provided with a light sensor that is connected to a control module and associated with the display screen to control the brightness or off of the display screen. For example, when the mobile phone is in a call state, the light sensor detects corresponding illumination parameter information, and may control a display area of the display screen to be turned off to avoid an accidental touch.

However, with the development of a display screen processing technology and the increasing screen-to-body ratio of a mobile phone screen, a ratio of a non-display area is decreasing, and it is difficult to stack and design light sensors on the mobile terminal. Moreover, the ambient light sensor (ALS) approaches a light emitting panel of an organic light-emitting diode (OLED)/liquid crystal display (LCD) of the display screen, and light of the light emitting panel leaked from the screen directly or indirectly illuminates the ALS, thereby resulting in a large noise floor and low detection accuracy.

SUMMARY

The disclosure generally relates to the technical field of electronic devices, and more particularly, to a device for detecting light intensity, a display screen and a mobile terminal.

In view of this, the disclosure provides a device for detecting light intensity, a display screen and a mobile terminal. Specifically, the disclosure is implemented by the following technical solutions.

According to a first aspect of the disclosure, there is provided a device for detecting light intensity, which may include a controller, and a first photosensitive sensor and a second photosensitive sensor which are electrically coupled to the controller, the first photosensitive sensor and the second photosensitive sensor being spaced apart and located in a same illumination environment, and the controller is configured to, when an external beam illuminates the first photosensitive sensor, perform calculation based on a difference value between illumination parameters of the first photosensitive sensor and the second photosensitive sensor to obtain a light intensity of the external beam.

According to a second aspect of the disclosure, there is provided a display screen, which may include a display screen layer; a device for detecting light intensity comprising: a controller, and a first photosensitive sensor and a second photosensitive sensor which are electrically coupled to the controller, the first photosensitive sensor and the second photosensitive sensor being spaced apart and located in a same illumination environment, and the controller is configured to, when an external beam illuminates the first photosensitive sensor, perform calculation based on a difference value between illumination parameters of the first photosensitive sensor and the second photosensitive sensor to obtain a light intensity of the external beam; and the display screen layer being provided with a light passage for guiding incidence of an external beam, the first photosensitive sensor being located in a direction along which the light passage extends.

According to a third aspect of the disclosure, there is provided a mobile terminal, which may include: a processor; and a memory configured to store executable instructions of the processor. The mobile terminal may further include a frame; a display screen, wherein the display screen comprising a display screen layer a device for detecting light intensity comprising: a controller, and a first photosensitive sensor and a second photosensitive sensor which are electrically coupled to the controller, the first photosensitive sensor and the second photosensitive sensor being spaced apart and located in a same illumination environment, and the controller is configured to, when an external beam illuminates the first photosensitive sensor, perform calculation based on a difference value between illumination parameters of the first photosensitive sensor and the second photosensitive sensor to obtain a light intensity of the external beam; and the display screen layer being provided with a light passage for guiding incidence of an external beam, the first photosensitive sensor being located in a direction along which the light passage extends, and the display screen being installed in the frame.

It is to be understood that the above general descriptions and detailed descriptions below are only exemplary and explanatory and not intended to limit the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terms used in the disclosure are for the purpose of describing particular embodiments only, and are not intended to limit the disclosure. "A/an", "said" and "the" in a singular form in the disclosure and the appended claims are also intended to include a plural form, unless other meanings are clearly denoted throughout the disclosure. It is also to be understood that term "and/or" used in the disclosure refers to and includes one or any or all possible combinations of multiple associated items that are listed.

It is to be understood that although the terms first, second, third, etc. may be used in the disclosure to describe various information, such information should not be limited to these terms. These terms are only used to distinguish the same type of information from each other. For example, without departing from the scope of the disclosure, first information may also be called second information and, similarly, second information may also be called first information. For example, term "if" used here may be explained as "while" or "when" or "responsive to determining", which depends on the context.

An ambient light sensor (ALS) integrated circuit may be applied to various displays and lighting devices to save power and improve user experience. With an ALS solution, system designers may automatically adjust the brightness of a display screen according to an ambient light intensity. A control of dynamic backlight brightness is carried out to save a great amount of power because the power consumption of backlight occupies a large proportion in the total power consumption of a system. In addition, the user experience can also be improved, and the brightness of the display screen is self-adjusted to an optimum state according to ambient light conditions.

Figure 1:
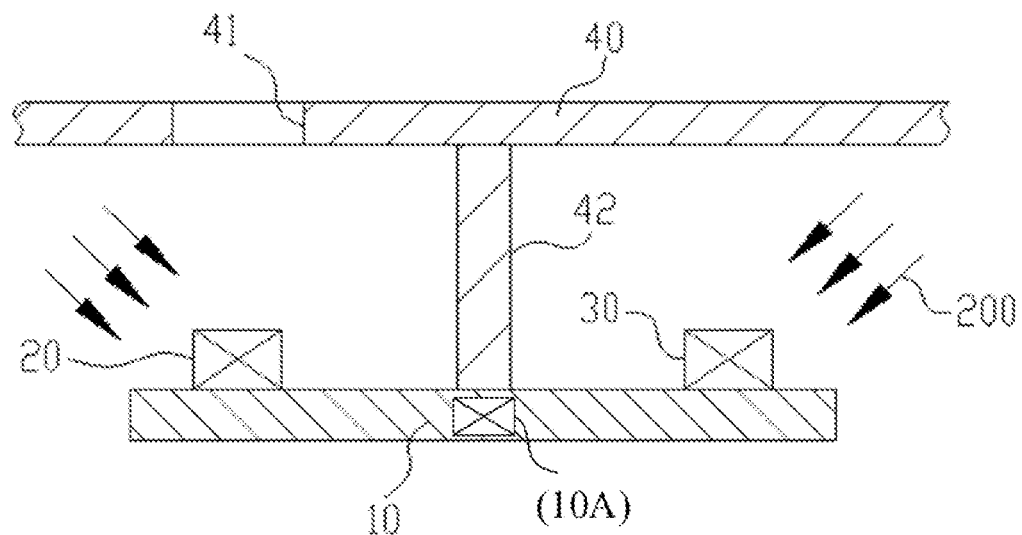
FIG. 1 is a partial structural diagram illustrating a display screen of a device for detecting light intensity under an initial illumination environment, according to an example of the present disclosure.
Figure 2:
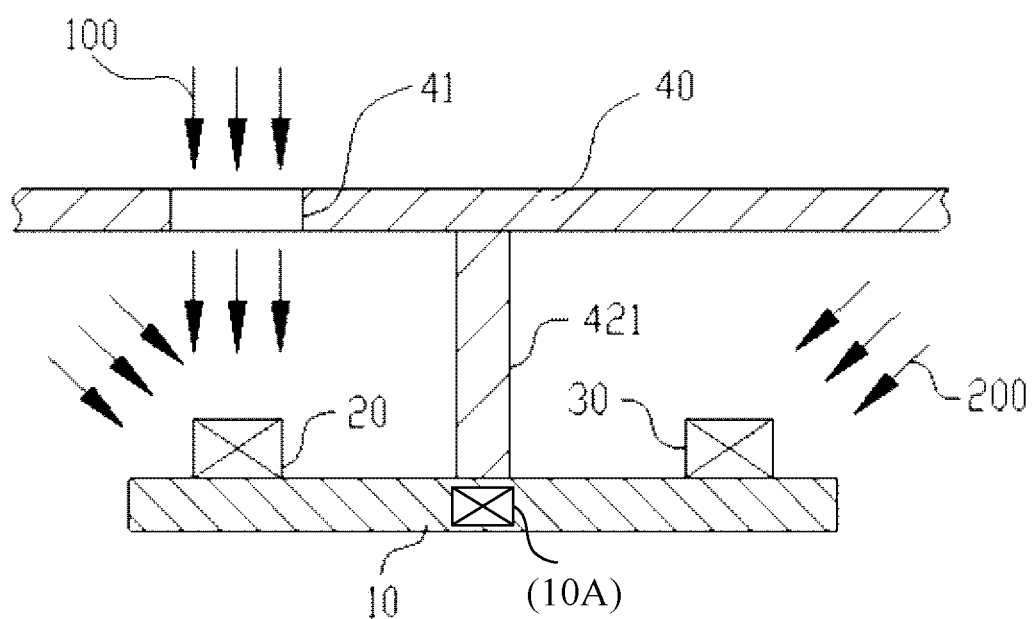
FIG. 2 is a partial structural diagram illustrating an external beam illuminating a first photosensitive sensor along a light passage, according to an example of the present disclosure.

As shown in FIG. 1 and FIG. 2, in one or more embodiments, a device for detecting light intensity includes a controller 10A coupled to layer 10, and a first photosensitive sensor 20 and a second photosensitive sensor 30 which are electrically connected to the controller 10A located within layer 10. The layer 10 may be a circuit board or other structure that holds at least electric photosensitive sensors 20 and 30 and partition plate 421. The photosensitive sensor 20 and 30 can be, for example, photoelectric sensors, photodiodes, photoresistors, light sensors, or any type of device or circuit that can detect the presence or absence of light. The first photosensitive sensor 20 and the second photosensitive sensor 30 are spaced apart and located in a same illumination environment 200. When an external beam 100 illuminates the first photosensitive sensor 20, the controller 10A coupled to layer 10 performs calculation based on a difference value between illumination parameters of the first photosensitive sensor 20 and the second photosensitive sensor 30 to obtain a light intensity of the external beam 100.

The first photosensitive sensor 20 and the second photosensitive sensor 30 are located in the same illumination environment 200, and have the same illumination parameters. That is, the first photosensitive sensor 20 and the second photosensitive sensor 30 have the same illumination intensity and illumination area under the illumination environment 200. Correspondingly, the illumination parameters, received by the controller 10A located within layer 10, of the first photosensitive sensor 20 and the second photosensitive sensor 30 are substantially the same, and the difference value therebetween may be set to zero.

When the external beam 100 illuminates the first photosensitive sensor 20 and the illumination environment 200 where the second photosensitive sensor 30 is located in is unchanged, the illumination parameter of the first photosensitive sensor 20 is changed under the illumination of the external beam 100, and the illumination parameter of the second photosensitive sensor 30 is unchanged. For example, a light intensity parameter of the first photosensitive sensor 20 is increased under the illumination of the external beam 100, and a light intensity parameter of the second photosensitive sensor 30 is unchanged. The controller 10A coupled to layer 10 performs calculation based on a difference value between the illumination parameters of the first photosensitive sensor 20 and the second photosensitive sensor 30 to obtain a light intensity of the external beam 100, and the calculation accuracy is good.

The controller 10A coupled to layer 10 may perform calculation based on the difference value between the illumination parameters of the first photosensitive sensor 20 and the second photosensitive sensor 30 through the following light intensity calculation formula: light intensity of external visible light=sensor_Data1−sensor_Data2, where sensor_Data1 is the light intensity parameter of the first photosensitive sensor 20 under the external beam 100 and the initial illumination environment 200, and Sensor_Data2 is the light intensity parameter of the second photosensitive sensor 30 under the initial illumination environment 200. The second photosensitive sensor 30 acts as a comparison reference element of the first photosensitive sensor 20. The impact on the detection accuracy of the external beam 100 caused by different illumination environments 200 may be avoided. The detection accuracy of the external beam 100 is high. It is worth mentioning that there may be one or more first photosensitive sensors 20, which may detect light intensity values of a plurality of points under different illumination intensities on the basis of the second photosensitive sensor 30, and the detection efficiency is high. The first photosensitive sensor 20 may eliminate the influence of illumination under the initial illumination environment 200 through the light intensity parameter of the second photosensitive sensor 30, only retains the light intensity parameter of the external beam 100, which has a wide range of an application.

The first photosensitive sensor 20 and the second photosensitive sensor 30 are located in the same illumination environment 200 to obtain light intensity parameters under the same condition. In one or more embodiments, the first photosensitive sensor 20 and the second photosensitive sensor 30 may be located in the same photosensitive unit. When the first photosensitive sensor 20 and the second photosensitive sensor 30 are simultaneously integrated on one photosensitive unit, the first photosensitive sensor 20 and the second photosensitive sensor 30 are installed with good synchronism and at a stable relative position. The photosensitive unit is integrally assembled to an applicable mobile terminal, which can simultaneously adjust the position and installation attitudes of the first photosensitive sensor 20 and the second photosensitive sensor 30 relative to the mobile terminal, thereby having a good adjustment effect. The first photosensitive sensor 20 and the second photosensitive sensor 30 are close to each other, so that the first photosensitive sensor 20 and the second photosensitive sensor 30 under an initial condition may be under substantially identical illumination environment 200. For example, the first photosensitive sensor 20 and the second photosensitive sensor 30 are spaced apart, and assembled to the mobile terminal in the same attitude. The attitude includes parameters associated with position which are represented such as an angle, position, installation height, and photosensitive plane spacing of a corresponding part relative to the mobile terminal. The external beam 100 directly illuminates the first photosensitive sensor 20, and the illumination environment 200 where the second photosensitive sensor 30 is located in is unchanged, so that light intensity parameters obtained by the first photosensitive sensor 20 and the second photosensitive sensor 30 form a difference value.

In another embodiment, the first photosensitive sensor 20 and the second photosensitive sensor 30 are provided as two separate light sensors. The first photosensitive sensor 20 and the second photosensitive sensor 30 are provided as separate light sensors, which are installed separately and thus have a good flexibility of assembly. The separately installation of first photosensitive sensor 20 and the second photosensitive sensor 30 can conveniently adjust the light intensity parameters under an initial state, so that the light intensity parameters thereof are substantially the same. The separately arrangement of the first photosensitive sensor 20 and the second photosensitive sensor 30 may also facilitate the adjustment of spacing therebetween, so that the second photosensitive sensor 30 may be prevented from being affected by the external beam 100, and thus an isolation effect of the second photosensitive sensor 30 is good. Correspondingly, the first photosensitive sensor 20 can receive the initial illumination environment 200 and the external beam 100, while the second photosensitive sensor 30 can only receive the initial illumination environment 200, and calculation accuracy of the light intensity of the external beam 100 is high.

Under an initial state, the first photosensitive sensor 20 and the second photosensitive sensor 30 are located in the same illumination environment 200, and the light intensity parameters of the first photosensitive sensor 20 and the second photosensitive sensor 30 are substantially the same. In an alternative embodiment, the first photosensitive sensor 20 and the second photosensitive sensor 30 are located in the same photosensitive plane. The first photosensitive sensor 20 and the second photosensitive sensor 30 are separately provided with a photosensitive surface receiving ambient light. The photosensitive surface of the first photosensitive sensor 20 and the photosensitive surface of the second photosensitive sensor 30 are located in the same photosensitive plane, so that the first photosensitive sensor 20 and the second photosensitive sensor 30 have high illumination uniformity and receive ambient light that is slightly different.

Figure 3:
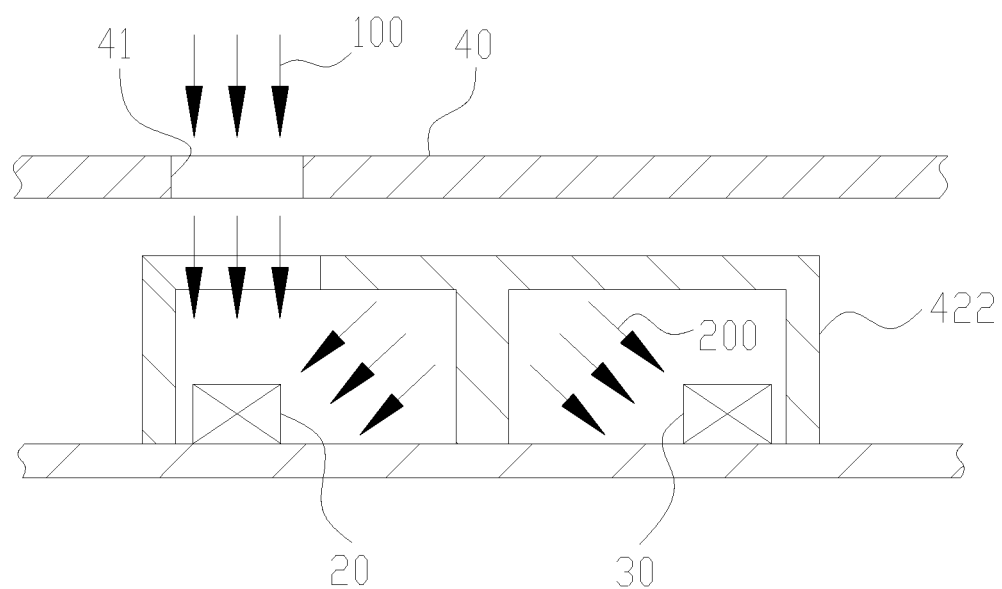
FIG. 3 is a cross-sectional structural diagram illustrating a light shading frame separating a first photosensitive sensor from a second photosensitive sensor, according to an example of the present disclosure.

As shown in FIG. 2 and FIG. 3, the device for detecting light intensity disclosed in the above embodiments is applied to a display screen, so that the display screen can adjust the display brightness or other parameters according to the light intensity of the external beam 100. In one or more embodiments, the display screen includes a display screen layer 40 and the device for detecting light intensity as disclosed in the above embodiments. The display screen layer 40 is provided with a light passage 41 for guiding incidence of the external beam 100. The first photosensitive sensor 20 is located in a direction along which the light passage 41 extends.

The first photosensitive sensor 20 and the second photosensitive sensor 30 are arranged correspondingly to the display screen layer 40, so that both of the first photosensitive sensor 20 and the second photosensitive sensor 30 are located in the illumination environment 200 of the display screen layer 40. The light intensity parameters of the first photosensitive sensor 20 and the second photosensitive sensor 30 are approximately the same.

The display screen layer 40 is provided with a light passage 41. The light passage 41 is provided as a light transmission area. The first photosensitive sensor 20 is located in a direction along which the light passage 41 extends, and the external beam 100 is emitted along the light passage 41 and illuminates the first photosensitive sensor 20. The external beam 100 has a good guidance quality and can only illuminate the first photosensitive sensor 20, while the first photosensitive sensor 20 is located in the illumination environment 200 of the display screen layer 40, and the second photosensitive sensor 30 and the first photosensitive sensor 20 are spaced apart and located in the illumination environment 200 of the display screen layer 40. Therefore, the difference value between the light intensity parameter detected by the first photosensitive sensor 20 and the light intensity parameter detected by the second photosensitive sensor 30 is the light intensity parameter of the external beam 100 illuminating the first photosensitive sensor 20, so that the detection accuracy of the light intensity parameter of the external beam 100 is high, and interference factors of other light sources are well excluded.

The light passage 41 is provided as a path for guiding the transmission of the external beam 100, so that the illumination range and angle of the external beam 100 are controllable. In an alternative embodiment, the light passage 41 includes a light transmission hole provided in the display screen layer 40. The light transmission hole is provided as a notch type structure, which may be a groove-like structure formed at an edge of the display screen layer 40. When the display screen is assembled to a housing of the mobile terminal, a light transmission slit is formed between the light transmission hole and the housing. Alternatively, the light transmission hole is provided as a through-hole structure that extends through a non-display area of the display screen layer 40. For example, the light transmission hole extends through a frame of the display screen layer 40.

In another alternative embodiment, the light passage 41 includes a light transmission area provided on the display screen layer 40, the light transmission area being made of a light transmission material. The display screen layer 40 is configured to output image information, where light emitted by a light emitting panel 44 (such as an OLED/LCD) of the display screen layer 40 is output outwards through a screen panel. An edge portion of the screen panel is processed by a silk screen printing process to form a corresponding light shading area to improve the aesthetic appearance of the display screen. Alternatively, the screen panel retains a corresponding non-silk-screened printing area within a silk screen printing range or is silk-screened printing area with a light transmission material, which constitutes the light transmission area. The external beam 100 can be emitted into the display screen along the light transmission area and then received by the first photosensitive sensor 20.

The second photosensitive sensor 30 and the first photosensitive sensor 20 are spaced apart and located in the illumination environment 200 of the display screen layer 40. In an embodiment, the display screen layer 40 separates the first photosensitive sensor 20 from the second photosensitive sensor 30. Under an initial condition, illumination received by the first photosensitive sensor 20 from the display screen layer 40 and illumination received by the second photosensitive sensor 30 from the display screen layer 40 have a same intensity.

The first photosensitive sensor 20 and the second photosensitive sensor 30 are adjacent to or fixed to the display screen layer 40, so that the first photosensitive sensor 20 and the second photosensitive sensor 30 are located within an illumination range of light emitted by the display screen layer 40. Correspondingly, the initial illumination environment 200 where the first photosensitive sensor 20 and the second photosensitive sensor 30 are located in is the illumination environment 200 of the display screen layer 40. Alternatively, the first photosensitive sensor 20 and the second photosensitive sensor 30 are arranged in parallel so that the positions and angles of the first photosensitive sensor 20 and the second photosensitive sensor 30 relative to the display screen layer 40 are the same, and the light intensity parameters detected by the first photosensitive sensor 20 and the second photosensitive sensor 30 are consistent.

Figure 4:
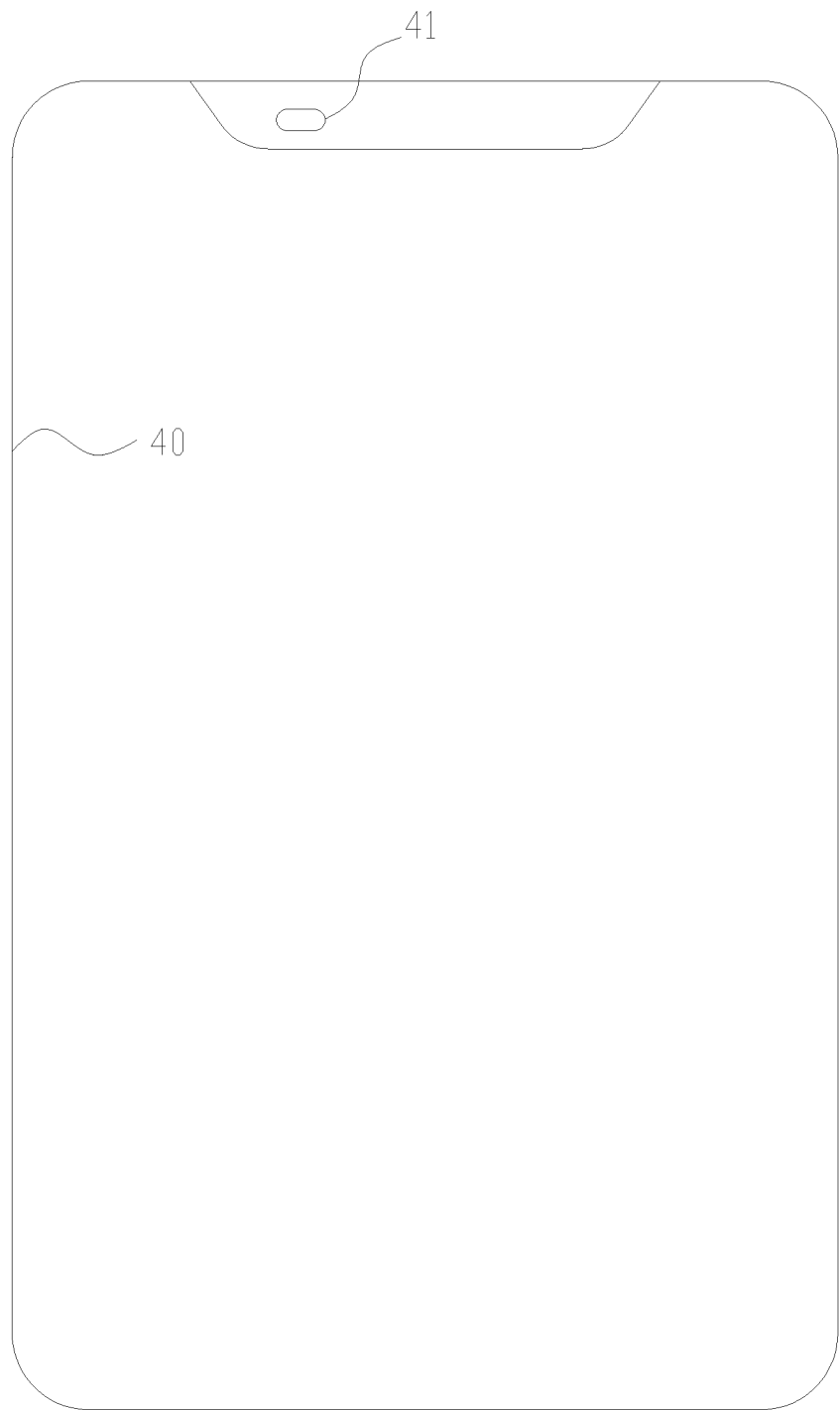
FIG. 4 is a structural diagram illustrating a mobile terminal, according to an example of the present disclosure.
Figure 5:
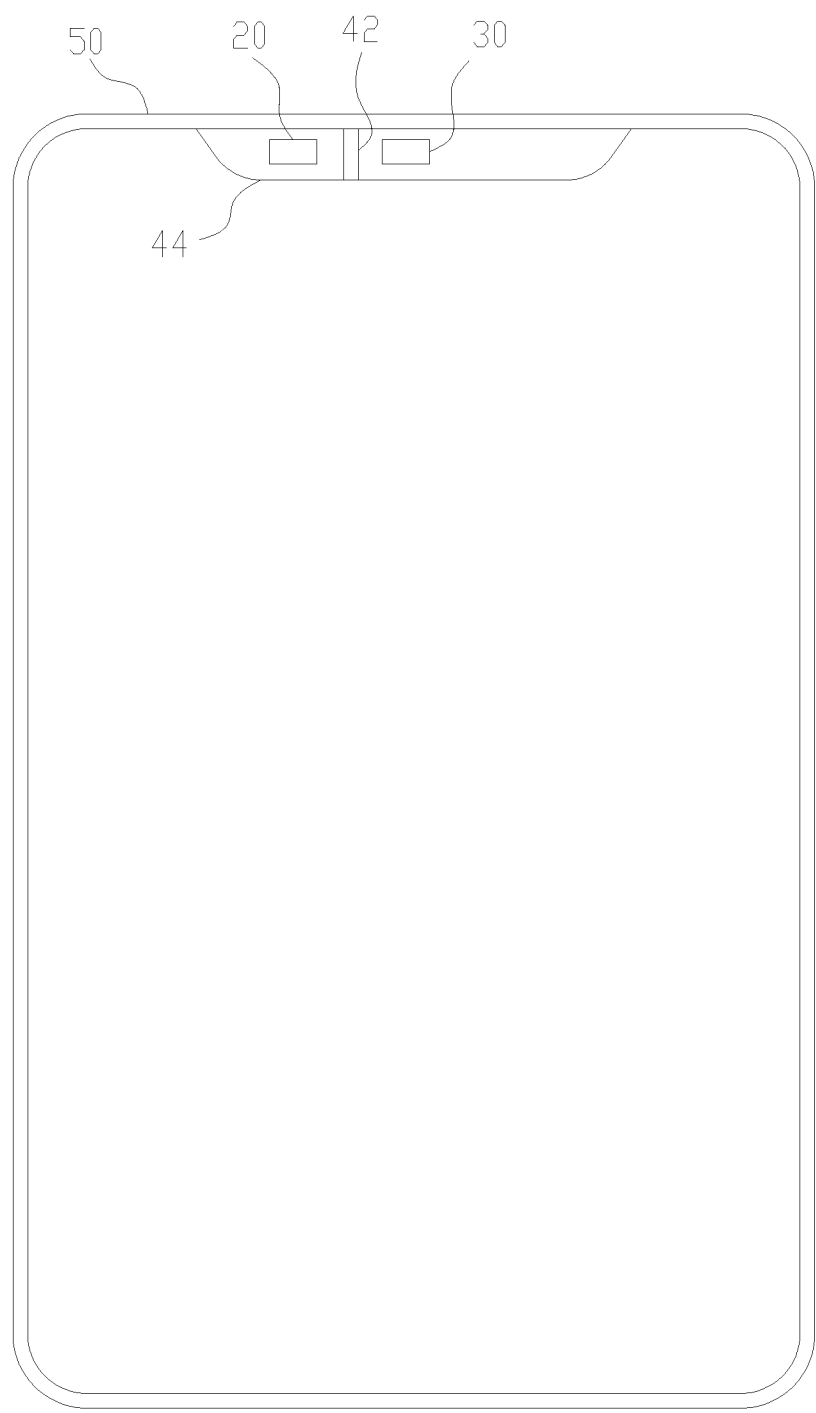
FIG. 5 is a structural diagram illustrating a mobile terminal from which a display screen is removed, according to an example of the present disclosure.
Figure 6:
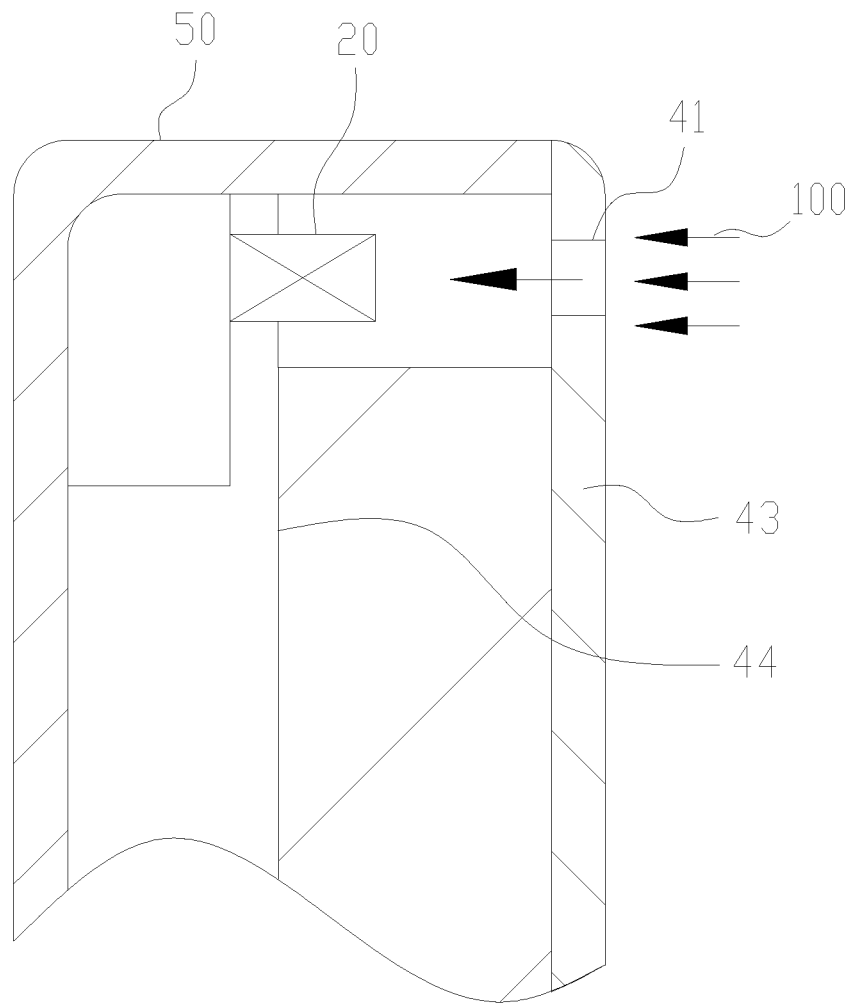
FIG. 6 is a cross-sectional enlarged structural diagram illustrating a mobile terminal at a first photosensitive sensor, according to an example of the present disclosure.

As shown in FIG. 4 to FIG. 6, in an alternative embodiment, the display screen layer 40 includes a light emitting panel 44 and a display screen 43 attached to the light emitting panel 44. The first photosensitive sensor 20 and the second photosensitive sensor 30 are both located in a same light leakage environment of the light emitting panel 44. The display screen 43 is attached to the light emitting panel 44, and a light leakage phenomenon is formed on the side of the light emitting panel 44 to avoid interference of light leakage to calculation of the light intensity of the external beam 100. The first photosensitive sensor 20 and the second photosensitive sensor 30 are both located in the same light leakage environment of the light emitting panel 44. The first photosensitive sensor 20 and the second photosensitive sensor 30 receive the same intensity of illumination from light leakage, that is, the light leakage environment forms the illumination environment 200 of the first photosensitive sensor 20 and the second photosensitive sensor 30 under the initial state. The external beam 100 is emitted into the light leakage environment through the light passage 41 and illuminates the first photosensitive sensor 20, the second photosensitive sensor 30 is separated from the light passage 41 via the display screen layer 40 and the light leakage environment where the second photosensitive sensor 30 is located in is unchanged. Therefore, the difference value between the light intensity parameter detected by the first photosensitive sensor 20 and the light intensity parameter detected by the second photosensitive sensor 30 is the light intensity parameter of the external beam 100 illuminating the first photosensitive sensor 20, so that the detection accuracy of the light intensity parameter of the external beam 100 is high, and light leakage interference factors of the light emitting panel 44 are well excluded.

The first photosensitive sensor 20 and the second photosensitive sensor 30 are both located in the same light leakage environment of the light emitting panel 44, and the first photosensitive sensor 20 and the second photosensitive sensor 30 under an initial condition have the same light intensity parameters. In an alternative embodiment, the distance between the first photosensitive sensor 20 and the light emitting panel 44 is equal to the distance between the second photosensitive sensor 30 and the light emitting panel 44, so that the quantity and range of illumination of the light emitting panel 44 which are received by the first photosensitive sensor 20 are equal to the quantity and range of illumination of the light emitting panel 44 which are received by the second photosensitive sensor 30.

In an alternative embodiment, an attitude of the first photosensitive sensor 20 relative to the display screen 43 is the same as an attitude of the second photosensitive sensor 30 relative to the display screen 43, so that the first photosensitive sensor 20 and the second photosensitive sensor 30 receive illumination at the same angle. The attitude of the first photosensitive sensor 20 relative to the display screen 43 includes an inclination angle or the like of the first photosensitive sensor 20 relative to the display screen 43.

Alternatively, the photosensitive surface of the first photosensitive sensor 20 is parallel to the display screen 43, the photosensitive surface of the second photosensitive sensor 30 is parallel to the display screen 43, and the first photosensitive sensor 20 and the second photosensitive sensor 30 are arranged in parallel and spaced apart. The light emitting panel 44 is attached to the display screen 43. A light leakage slit is formed between the edge of the light emitting panel 44 and the display screen 43. Light emitted by the light emitting panel 44 illuminates the photosensitive surface of the first photosensitive sensor 20 and the photosensitive surface of the second photosensitive sensor 30 along the light leakage slit, respectively, thereby having a good consistency.

The display screen layer 40 separates the first photosensitive sensor 20 and the second photosensitive sensor 30 to prevent the external beam 100 from affecting the light intensity parameter of the second photosensitive sensor 30. In an embodiment, the display screen layer 40 is provided with a light shading portion 42. The light shading portion 42 separates the light passage 41 from the second photosensitive sensor 30 to prevent the external beam 100 from illuminating the second photosensitive sensor 30. The light shading portion 42 separates the light passage 41 from the second photosensitive sensor 30 to prevent the external beam 100 from interfering with the illumination environment 200 of the second photosensitive sensor 30. Meanwhile, the light shading portion 42 is required to make the initial illumination environment 200 where the first photosensitive sensor 20 and the second photosensitive sensor 30 are located in remain the same.

As shown in FIG. 2, alternatively, the first photosensitive sensor 20 and the second photosensitive sensor 30 are spaced apart, the light shading portion 42 has a convex structure and is inserted between the first photosensitive sensor 20 and the second photosensitive sensor 30, thereby having a good isolation effect. In an alternative embodiment, the light shading portion 42 includes a partition plate 421 extending between the first photosensitive sensor 20 and the second photosensitive sensor 30. The partition plate 421 is made of a lightproof material, and spaces the first photosensitive sensor 20 and the second photosensitive sensor 30 apart to provide a good light blocking effect.

As shown in FIG. 3, in an alternative embodiment, the light shading portion 42 includes a light shading frame 422 detachably connected to the device for detecting light intensity. Alternatively, the light shading frame 422 is provided as a cover structure, and covers the second photosensitive sensor 30 to space the light passage 41 and the second photosensitive sensor 30 apart, so that the shielding effect is good and the light leakage environment is stable. Alternatively, the light shading frame 422 is provided with two shielding spaces spaced apart, both of which are connected to the light transmitting slit. The first photosensitive sensor 20 and the second photosensitive sensor 30 are respectively located in the corresponding shielding spaces and are not connected, so that the separation effect is good. The light shading frame 422 is provided with a through-hole connected to the light passage 41, so that the external beam 100 may illuminate the first photosensitive sensor 20, the light guiding effect is good, and the external beam 100 is tested accurately.

As shown in FIG. 4 to FIG. 6, the display screen disclosed in the above embodiment is applied to a mobile terminal to enable the mobile terminal to control the display brightness of the display screen according to the change of ambient light. In an embodiment, the mobile terminal includes: a processor; and a memory configured to store executable instructions for the processor, where the mobile terminal further includes a frame 50 and a display screen disclosed in the above embodiment, and the display screen is installed in the frame 50.

Figure 7:
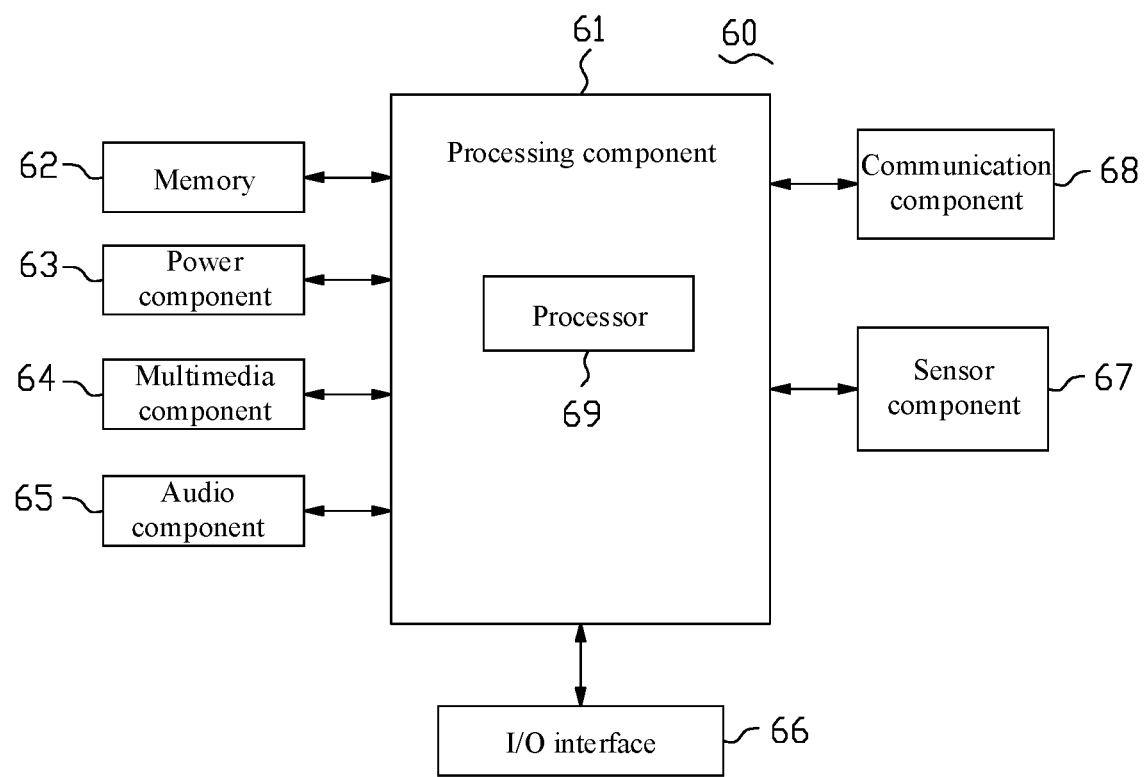
FIG. 7 is a block diagram illustrating a mobile terminal, according to an example of the present disclosure.

As shown in FIG. 7, the mobile terminal may be provided as different electronic devices. For example, the mobile terminal 60 may be a mobile phone, a computer, a digital broadcast terminal, a messaging device, a gaming console, a tablet device, a medical device, exercise equipment, a personal digital assistant, an interpreter, etc.

The mobile terminal 60 may include one or more of the following components: a processing component 61, a memory 62, a power component 63, a multimedia component 64, an audio component 65, an Input/Output (I/O) interface 66, a sensor component 67, and a communication component 68.

The processing component 61 typically controls overall operations of the mobile terminal 60, such as operations associated with display, telephone calls, data communications, camera operations, and recording operations. The processing component 61 may include one or more processors 69 for executing instructions to complete all or part of the steps in the above method. Moreover, the processing component 61 may include one or more modules which facilitate the interaction between the processing component 61 and other components. For example, the processing component 61 may include a multimedia module to facilitate the interaction between the multimedia component 64 and the processing component 61.

The memory 62 is configured to store various types of data to support operations at the mobile terminal 60. Examples of such data include instructions for any applications or methods operated on the mobile terminal 60, contact data, phonebook data, messages, pictures, video, etc. The memory 62 may be implemented using any type of volatile or non-volatile memory devices, or a combination thereof, such as a Static Random Access Memory (SRAM) 62, an Electrically Erasable Programmable Read-Only Memory (EEPROM) 62, an Erasable Programmable Read-Only Memory (EPROM) 62, a Programmable Read-Only Memory (PROM) 62, a Read-Only Memory (ROM) 62, a magnetic memory 62, a flash memory 62, a magnetic disk or an optical disk.

The power component 63 provides power to various components of the mobile terminal 60. The power component 63 may include a power management system, one or more power sources, and any other components associated with the generation, management and distribution of power for the mobile terminal 60.

The multimedia component 64 includes a screen providing an output interface between the mobile terminal 60 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 64 includes a front camera and/or a rear camera. The front camera and/or the rear camera may receive external multimedia data when the mobile terminal 60 is in an operation mode, such as a photographing mode or a video mode. Each of the front camera and the rear camera may be a fixed optical lens system or may have focusing and optical zooming capabilities.

The audio component 65 is configured to output and/or input audio signals. For example, the audio component 65 includes a Microphone (MIC) configured to receive an external audio signal when the mobile terminal 60 is in an operation mode, such as a call mode, a recording mode, and a voice recognition mode. The received audio signal may be further stored in the memory 62 or transmitted via the communication component 68. In some embodiments, the audio component 65 further includes a speaker for outputting the audio signal.

The I/O interface 66 provides an interface between the processing component 61 and peripheral interface modules, such as a keyboard, a click wheel, or buttons. The buttons may include, but are not limited to, a home button, a volume button, a starting button, and a locking button.

The sensor component 67 includes one or more sensors for providing status assessments of various aspects of the mobile terminal 60. For example, the sensor component 67 may detect an on/off state of a device and relative positioning of components. For example, the component is a display and small keyboard of the mobile terminal 60. The sensor component 67 may further detect the position change of the mobile terminal 60 or a component of the mobile terminal 60, presence or absence of a contact between the user and the mobile terminal 60, orientation or acceleration/deceleration of the mobile terminal 60, and the temperature change of the mobile terminal 60. The sensor component 67 may include a proximity sensor configured to detect presence of an object nearby without any physical contact. The sensor component 67 may also include a light sensor, such as a Complementary Metal Oxide Semiconductor (CMOS) or Charge Coupled Device (CCD) image sensor, configured for use in an imaging application. In some embodiments, the sensor component 67 may also include an acceleration sensor, a gyroscope sensor, a magnetic sensor, a pressure sensor or a temperature sensor.

The communication component 68 is configured to facilitate a wired or wireless communication between the mobile terminal 60 and other devices. The mobile terminal 60 may access a wireless network based on a communication standard, such as WiFi, 2G, 4G, 5G, or a combination thereof. In an exemplary embodiment, the communication component 68 receives a broadcast signal or broadcast associated information from an external broadcast management system via a broadcast channel. In an exemplary embodiment, the communication component 68 further includes a Near Field Communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth (BT) technology, and other technologies.

In exemplary embodiments, the mobile terminal 60 may be implemented with one or more Application Specific Integrated Circuits (ASIC), Digital Signal Processors (DSP) 69, Digital Signal Processing Devices (DSPD), Programmable Logic Devices (PLD), Field Programmable Gate Arrays (FPGA), controllers, micro-controllers, microprocessors 69, or other electronic elements, for performing the above method.

Other embodiments of the invention will be apparent to those skilled in the art from consideration of the specification and practice of the invention disclosed here. This disclosure is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A device for detecting light intensity, comprising:
a controller, and a first photosensitive sensor and a second photosensitive sensor which are electrically coupled to the controller, the first photosensitive sensor and the second photosensitive sensor being spaced apart and located in a same initial illumination environment, wherein under the initial illumination environment, illumination received by the first photosensitive sensor and illumination received by the second photosensitive sensor have a same intensity, and
wherein the controller is configured to, when an external beam illuminates the first photosensitive sensor, perform calculation based on a difference value between illumination parameters of the first photosensitive sensor under the initial illumination environment and the external beam and the second photosensitive sensor under the initial illumination environment to obtain a light intensity of the external beam.

2. The device for detecting light intensity of claim 1, wherein the first photosensitive sensor and the second photosensitive sensor are integrated in a same photosensitive unit; or the first photosensitive sensor and the second photosensitive sensor are provided as two separate light sensors.

3. The device for detecting light intensity of claim 1, wherein the first photosensitive sensor and the second photosensitive sensor are located in a same photosensitive plane.

4. A display screen, comprising:
a display screen layer;
a device for detecting light intensity comprising:
a controller, and a first photosensitive sensor and a second photosensitive sensor which are electrically coupled to the controller, the first photosensitive sensor and the second photosensitive sensor being spaced apart and located in a same initial illumination environment, wherein under the initial illumination environment, illumination received by the first photosensitive sensor and illumination received by the second photosensitive sensor have a same intensity; and
the controller is configured to, when an external beam illuminates the first photosensitive sensor, perform calculation based on a difference value between illumination parameters of the first photosensitive sensor under the initial illumination environment and the external beam and the second photosensitive sensor under the initial illumination environment to obtain a light intensity of the external beam; and
the display screen layer being provided with a light passage for guiding incidence of the external beam, the first photosensitive sensor being located in a direction along which the light passage extends.

5. The display screen of claim 4, wherein the display screen layer is configured to separate the first photosensitive sensor from the second photosensitive sensor, and under the initial illumination environment, illumination received by the first photosensitive sensor from the display screen layer and illumination received by the second photosensitive sensor from the display screen layer have a same intensity.

6. The display screen of claim 5, wherein the display screen layer comprises a light emitting panel and a display screen attached to the light emitting panel, the first photosensitive sensor and the second photosensitive sensor being both located in a same light leakage environment of the light emitting panel.

7. The display screen of claim 6, wherein a distance between the first photosensitive sensor and the light emitting panel is equal to a distance between the second photosensitive sensor and the light emitting panel.

8. The display screen of claim 6, wherein an attitude of the first photosensitive sensor relative to the display screen is same as an attitude of the second photosensitive sensor relative to the display screen.

9. The display screen of claim 5, wherein the display screen layer is provided with a light shading portion that separates the light passage from the second photosensitive sensor to prevent the external beam from illuminating the second photosensitive sensor.

10. The display screen of claim 9, wherein the light shading portion comprises a partition plate extending between the first photosensitive sensor and the second photosensitive sensor; or the light shading portion comprises a light shading frame detachably coupled to the device for detecting light intensity.

11. The display screen of claim 4, wherein the light passage comprises a light transmission hole provided in the display screen layer; or the light passage comprises a light transmission area provided on the display screen layer, the light transmission area being made of a light transmission material.

12. The display screen of claim 8, wherein the attitude comprises at least one of an angle, a position, an installation height, or a photosensitive plane spacing of a corresponding part relative to a mobile terminal.

13. The display screen of claim 10, wherein the light shading frame is provided with two shielding spaces spaced apart.

14. The display screen of claim 13, wherein the first photosensitive sensor and the second photosensitive sensor are respectively located in the two shielding spaces.

15. The display screen of claim 10, wherein the light shading frame is provided with a through-hole coupled to the light passage to illuminate the first photosensitive sensor by the external beam.

16. A mobile terminal, comprising:
a processor; and
a memory configured to store executable instructions of the processor,
the mobile terminal further comprising:
a frame;
a display screen, wherein the display screen comprising a display screen layer a device for detecting light intensity comprising:
a controller, and a first photosensitive sensor and a second photosensitive sensor which are electrically coupled to the controller, the first photosensitive sensor and the second photosensitive sensor being spaced apart and located in a same initial illumination environment, wherein under the initial illumination environment, illumination received by the first photosensitive sensor and illumination received by the second photosensitive sensor have a same intensity; and the controller is configured to, when an external beam illuminates the first photosensitive sensor, perform calculation based on a difference value between illumination parameters of the first photosensitive sensor under the initial illumination environment and the external beam and the second photosensitive sensor under the initial illumination environment to obtain a light intensity of the external beam; and the display screen layer being provided with a light passage for guiding incidence of the external beam, the first photosensitive sensor being located in a direction along which the light passage extends, and the display screen being installed in the frame.

17. The mobile terminal of claim 16, wherein the display screen layer is configured to separate the first photosensitive sensor from the second photosensitive sensor, and under the initial illumination environment, illumination received by the first photosensitive sensor from the display screen layer and illumination received by the second photosensitive sensor from the display screen layer have a same intensity.

18. The mobile terminal of claim 17, wherein the display screen layer comprises a light emitting panel and a display screen attached to the light emitting panel, the first photosensitive sensor and the second photosensitive sensor being both located in a same light leakage environment of the light emitting panel.

19. The mobile terminal of claim 18, wherein a distance between the first photosensitive sensor and the light emitting panel is equal to a distance between the second photosensitive sensor and the light emitting panel.

20. The mobile terminal of claim 18, wherein an attitude of the first photosensitive sensor relative to the display screen is same as an attitude of the second photosensitive sensor relative to the display screen.

* * * * *